United States Patent
Suzuki et al.

(10) Patent No.: US 9,024,553 B2
(45) Date of Patent: May 5, 2015

(54) AC MOTOR CONTROL APPARATUS

(71) Applicant: Denso Corporation, Kariya, Aichi-pref. (JP)

(72) Inventors: Takashi Suzuki, Anjo (JP); Takeshi Itoh, Nagoya (JP); Hirofumi Kako, Chita-gun (JP)

(73) Assignee: Denso Corporation, Kariya (JP)

( * ) Notice: Subject to any disclaimer, the term of this patent is extended or adjusted under 35 U.S.C. 154(b) by 55 days.

(21) Appl. No.: 13/867,687

(22) Filed: Apr. 22, 2013

(65) Prior Publication Data

US 2013/0278188 A1 Oct. 24, 2013

(30) Foreign Application Priority Data

Apr. 22, 2012 (JP) .................................. 2012-97220

(51) Int. Cl.
*H02P 21/00* (2006.01)
*H02P 21/14* (2006.01)

(52) U.S. Cl.
CPC ...................................... *H02P 21/14* (2013.01)

(58) Field of Classification Search
CPC ... H02P 21/00; H02P 21/003; H02P 21/0035; H02P 2021/0067; H02P 21/0096
USPC ............... 318/801, 811, 798, 799, 254.1, 437
See application file for complete search history.

(56) References Cited

U.S. PATENT DOCUMENTS

| | | | | |
|---|---|---|---|---|
| 6,163,130 | A | * | 12/2000 | Neko et al. ..................... 318/806 |
| 6,229,719 | B1 | * | 5/2001 | Sakai et al. ..................... 363/37 |
| 7,598,698 | B2 | * | 10/2009 | Hashimoto et al. ........... 318/801 |
| 8,362,759 | B2 | * | 1/2013 | Ha et al. ....................... 324/76.15 |
| 2008/0079385 | A1 | | 4/2008 | Hashimoto et al. |
| 2009/0058337 | A1 | * | 3/2009 | Kato et al. ................ 318/400.09 |
| 2011/0221368 | A1 | * | 9/2011 | Yabuguchi ............... 318/400.02 |

FOREIGN PATENT DOCUMENTS

| | | |
|---|---|---|
| JP | 2001-145398 | 5/2001 |
| JP | 2008-086139 | 4/2008 |
| JP | 2010-200430 | 9/2010 |

OTHER PUBLICATIONS

Suzuki, U.S. Appl. No. 13/867,392, filed Apr. 22, 2013.
Suzuki, U.S. Appl. No. 13/867,297, filed Apr. 22, 2013.
Suzuki, U.S. Appl. No. 13/867,319, filed Apr. 22, 2013.
Suzuki, U.S. Appl. No. 13/867,282, filed Apr. 22, 2013.

* cited by examiner

*Primary Examiner* — Rina Duda
*Assistant Examiner* — Bickey Dhakal
(74) *Attorney, Agent, or Firm* — Nixon & Vanderhye PC (57) ABSTRACT

A control apparatus of an AC motor improves an electric current estimation accuracy of the AC motor, which includes a three phase motor with an electric current detector to detect an electric current detection value of one of the three phases (a sensor phase). The control apparatus includes an electric current estimation unit that repeatedly performs an inverted dq conversion and a dq conversion. The inverted dq conversion calculates an electric current estimate values for phases other than the sensor phase based on the d/q axis electric current estimate values of a previous cycle. The dq conversion calculates the d/q axis electric current estimate values of a current cycle in a rotation coordinate system of the AC motor based on the electric current estimate values calculated by the inverted dq conversion and the electric current detection value of the sensor phase detected by the electric current detector.

2 Claims, 9 Drawing Sheets

AC MOTOR CONTROL APPARATUS

CROSS REFERENCE TO RELATED APPLICATION

This application is based on and claims the benefit of priority of Japanese Patent Application No. 2012-97220 filed on Apr. 22, 2012, the disclosure of which is incorporated herein by reference.

TECHNICAL FIELD

The present disclosure generally relates to a control apparatus of an alternate current (AC) motor.

BACKGROUND

In recent years, electric and hybrid vehicles driven by an alternate current (AC) motor are the focus of attention in terms of their advantageous features that match a social demand for low fuel consumption and low exhaust gas emission.

For instance, in some electric vehicles, the AC motor and a direct current power source of a secondary battery are connected by way of a motor controller, which includes an inverter. The AC motor is driven by converting a direct current voltage of the direct current power source into an alternate current voltage with the inverter. In some hybrid vehicles, two AC motors and the direct current power source of the secondary battery are connected by way of the motor controller, which includes the inverter, to drive the AC motors by converting a direct current voltage of the direct current power source into an alternate current voltage with the inverter.

The control systems of such AC motors in the electric and hybrid vehicles detect two or more phase electric currents in the three-phase AC motor, by two or more electric current sensors. Based on the electric current detected from the sensors, the AC motor is controlled. However, by having many electric current sensors for one AC motor, a reduction of the size, volume, and cost of the three phase output terminals as well as the motor control system as a whole is hindered.

An effort to reduce the cost of the AC motor control system is proposed in, for example, Japanese Patent Laid-Open No. 2001-145398 (patent document 1), which is U.S. Pat. No. 6,229,719. Patent document 1 discloses reducing the number of electric current sensors by detecting the electric current of one of three phases in the AC motor (i.e., U phase) via one current sensor. In particular, based on the electric current detected in one phase (i.e., U) by the current sensor and the electric current estimate values of the other two phases (i.e., V, W phases) in a previous cycle, a d-axis electric current estimate value (i.e., an excitation-origin electric current estimate value) and a q-axis electric current estimate value (i.e., a torque-origin electric current estimate value) are calculated. Based on the smoothed values of the d-axis electric current estimate value and the q-axis electric current estimate value, which may be averaged (i.e., smoothed) by a first-order delay filter, the electric current estimate values in other two phases are also calculated, for controlling the AC motor by using the q-axis electric current estimate value (or, using both of the d-axis electric current estimate value and the q-axis electric current estimate value).

The technique of patent document 1 enables the reduction in volume and cost of the inverter by devising a single phase sensing of electric current, which uses only one electric current sensor for one AC motor. However, depending on an operation condition of the AC motor, such a technique may not yield a sufficiently stable electric current estimation accuracy for controlling the AC motor. Further, an insufficient estimation accuracy of the electric current for the AC motor may lead to, for example, a deteriorated output torque accuracy and an unstable output torque due to the unstable supply of the electric current, and may further lead to a breakdown of the AC motor and the inverter due to an abnormal electric current and/or voltage. More specifically, since the AC motor in the electric or hybrid vehicle is used in various conditions raging from a vehicle parking condition to a high speed travel (i.e., from no torque to a rated maximum torque), the insufficient estimation accuracy may be problematic. Such insufficient estimation accuracy may also be problematic in other types of devices.

SUMMARY

The present disclosure provides for a control apparatus of an AC motor that is equipped with an electric current sensor for detecting an electric current in one of many phases of the AC motor. The control apparatus prevents a deterioration of the estimation accuracy of an output torque of the AC motor to enable a stable control of the AC motor by improving an electric current estimation accuracy for the AC motor.

Based on the inventors study, the apparatus of patent document 1 estimates a d-axis electric current estimate value and a q-axis electric current estimate value based on (i) the electric current detection value in one phase, which is detected by the electric current sensor, and (ii) electric current estimate values of other two phases in a previous cycle. The electric current estimate values in the other two phases (i.e., in non-sensor phases) are calculated based on the smoothed values derived by smoothing the d-axis electric current estimate value and the q-axis electric current estimate value (i.e., the d/q axis electric current estimate values for brevity).

The inventors of the present application have found, after an intensive study of their own, that the technique of patent document 1 yields a high estimation accuracy of the electric current at an extremely low rotation speed of the AC motor, but does not yield a sufficient estimation accuracy of the electric current at higher rotation speeds. That is, the electric current estimate value shifts in a phase delay direction and in an absolute value decreasing direction, which steadily causes a greater estimation error. Whether it is possible to correctly estimate a constant d/q axis electric current value, if the estimate values are set as zero in the estimation process as an initial condition (i.e., zero estimation value of the d/q axis electric current estimate values) is provided at the beginning of the estimation process.

As a result of the study, the inventors of the present application has found that the cause of such increase of the steady estimation error is in the delay of the phases of the electric current estimate values of the other two phases in a previous cycle, which are used for the calculation of the d/q axis electric current estimate values.

The d/q axis electric current estimate values in the other two phases, which are alternate current values in synchronization with the rotation angle of the AC motor, have a phase delay from the electric current detection value in one phase detected in the current cycle, because the AC motor rotates in a process between the previous cycle and the current cycle, which causes such a change of the rotation angle.

Therefore, when calculating the d/q axis electric current estimate values by performing the dq conversion based on the electric current detection value in the one phase and the electric current estimate values in the other two phases, a mismatch of the phase between the one phase of the electric current detection value and the other two phases of the electric current estimate values causes the electric current estimation error, or such error from the previous cycle is kept unchanged, to cause a steady estimation error, thereby deteriorating the estimation accuracy.

In an aspect of the present disclosure the control apparatus of the AC motor improves the electric current estimation accuracy of the AC motor. The control apparatus is for the AC motor that includes a three-phase AC motor and an electric current detector for detecting an electric current flowing in a sensor phase, which is one phase of the three-phase AC motor.

The control apparatus includes an electric current estimation unit that repeatedly performs, at predetermined intervals, an inverted dq conversion and a dq conversion for determining a d/q axis electric current estimate values. The inverted dq conversion calculates an electric current estimate values for phases other than the sensor phase based on the d/q axis electric current estimate values of a previous cycle in a rotation coordinate system of the AC motor. The dq conversion calculates the d/q axis electric current estimate values of a current cycle based on the electric current estimate values for the phases other than the sensor phase calculated by the inverted dq conversion and the electric current detection value of the sensor phase detected by the electric current detector.

In such configuration, the electric current estimate values of the previous cycle used in the current calculation are the d/q axis electric current estimate values, which are not the electric current estimate values of the other two phases. As described, the phase delay is caused due to the synchronization of the electric current estimate values of the other two phases with the rotation angle of the AC motor, which constantly changes as alternate current values. The dq conversion for converting such an alternate current value to a direct current value removes the rotation angle factor based on such rotation angle, thereby yielding the d/q axis electric current estimate values as the direct current values. Therefore, even when a change is caused in the rotation angle due to the rotation of the AC motor in a process between the previous cycle and the current cycle, no defect such as a phase delay will be caused.

Further, the electric current estimate values of the other two phases derived from the inverted dq conversion based on the d/q axis electric current estimate values in the current cycle have its basis of calculation on the information of the rotation angle of the motor in the current cycle. Therefore, the phase matches among the estimate values. Thus, the possibility of a steady error in the estimation (i.e., an electric current estimation error or a "hangover" of such error from the previous cycle in the estimation), due to the mismatch between the electric current estimate value in one phase and the electric current estimate values in the other two phases is removed or eliminated.

In such manner, the phase delay of the electric current estimate values in the other two phases relative to the electric current detection value in the sensor phase, which causes the steady estimation error, is prevented. Therefore, by the single-phase sensing of the electric current, the estimation accuracy of the d/q axis electric current estimate values as well as the electric current estimate value of the other phases is improved, which enables an improved accuracy of the electric current estimate value in the AC motor, without compromising the volume or cost reduction requirement.

Further, in addition, the electric current estimation unit may calculate, in the inverted dq conversion, the electric current estimate values of the other phases based on the smoothed value of the d/q axis electric current estimate values. In such manner, the fluctuation in the d/q axis electric current estimate values is controlled, and the accuracy of the electric current estimate values on the other phases based on the based on the d/q axis electric current estimate values is further improved.

Further, a power supply for the AC motor may be controlled based on the d/q axis electric current estimate values. The present disclosure prevents the deterioration of the accuracy of the output torque from the AC motor by accurately controlling the power supply for the AC motor by using the d/q axis electric current estimate values, thereby enabling a stable control of the electric current in the AC motor.

BRIEF DESCRIPTION OF THE DRAWINGS

Other objects, features and advantages of the disclosure will become more apparent from the following detailed description disposed with reference to the accompanying drawings, in which.

DETAILED DESCRIPTION

Examples of the present disclosure are described in the following, as an application to a hybrid vehicle, which is driven by an alternate current (AC) motor and an internal combustion engine.

Figure 1:
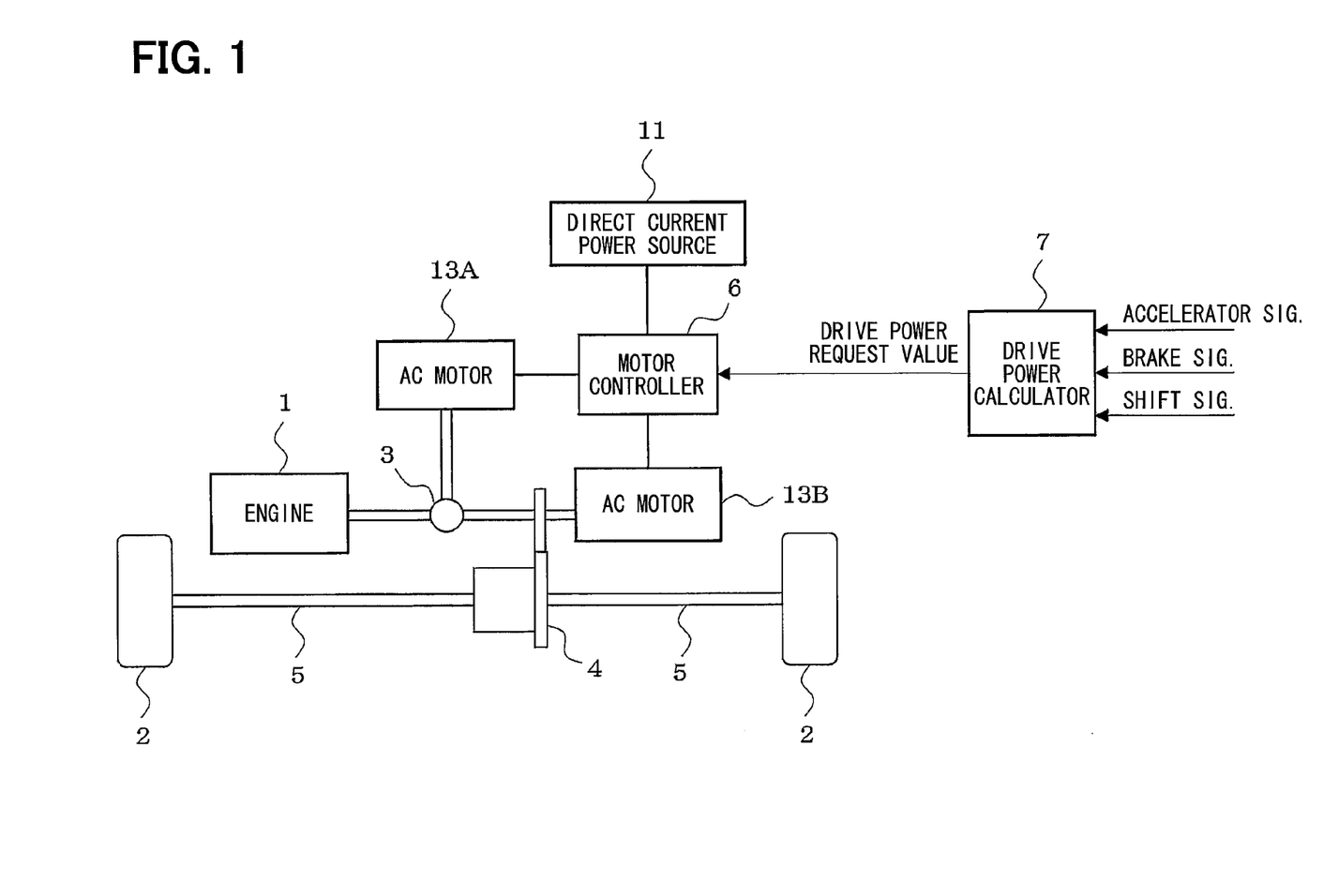
FIG. 1 is a block diagram of a drive system of a hybrid vehicle of the present disclosure.

The present disclosure is described with reference to the drawings. A drive system of a hybrid vehicle is illustrated in FIG. 1. The drive system includes an engine 1, an AC motor 13A (a first motor), and an AC motor 13B (a second motor). The driving power for driving wheels 2 of the vehicle comes from the AC motors 13A, 13B and is transmitted to a shaft of the AC motor 13B, which is combined with an output from the engine 1. Specifically, the crank shaft of the engine 1 is connected to the shaft of the AC motor 13A and to the shaft of the AC motor 13B though a power splitting mechanism 3 (e.g., a planetary gear), and the shaft of the AC motor 13B is further connected to a wheel shaft 5 through a differential gear 4.

Figure 2:
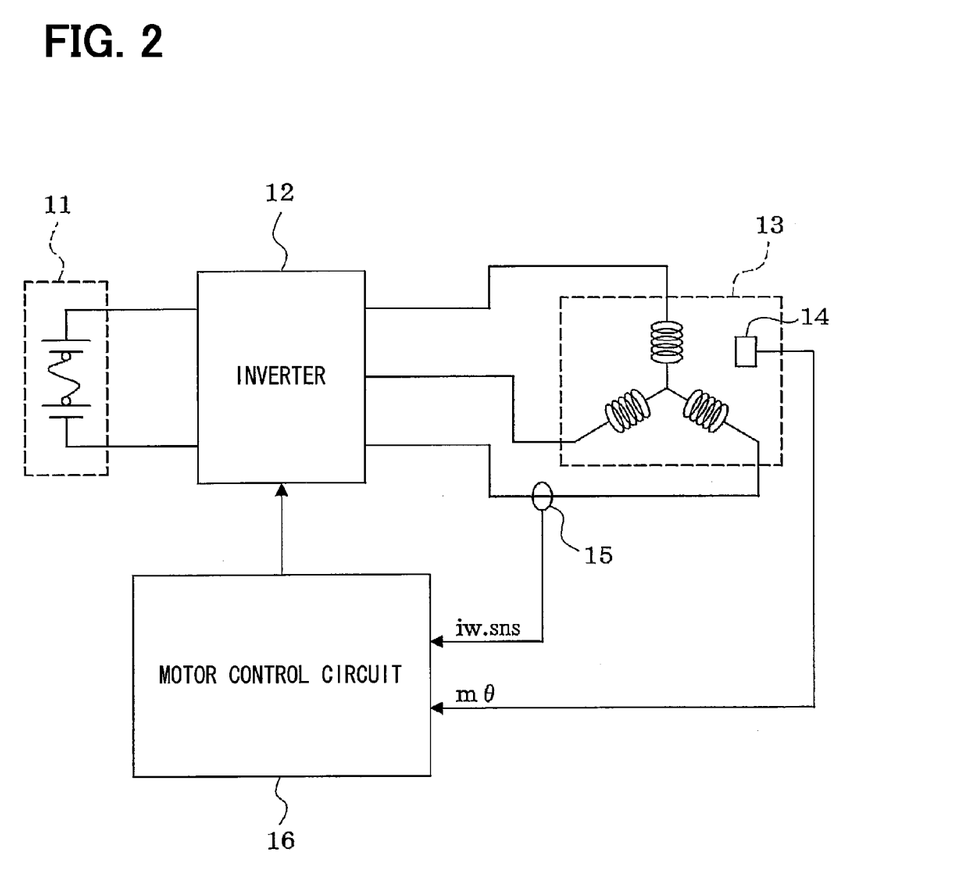
FIG. 2 is a block diagram of an alternate current (AC) motor control system of the drive system.

The AC motors 13A, 13B are connected to a direct current power source 11 through a motor controller 6, which includes, for example, an inverter 12 and a motor control circuit 16 (FIG. 2). The power source 11, which may be a secondary battery, may supply the direct current for the AC motors 13A, 13B or may receive the direct current that is returned (i.e., charged) from the AC motors 13A, 13B through the motor controller 6.

The drive system of the hybrid vehicle also includes a drive power calculator 7 that controls the hybrid vehicle. The drive power calculator 7, which is a computer or a similar component, detects a driving condition of the vehicle by reading signals from various sensors and devices, such as an accelerator sensor, a brake switch, and a shift switch.

The drive power calculator 7 transmits and receives a control signal and a data signal to and from an engine control circuit that controls an operation of the engine 1 and the motor control circuit 16 that controls an operation of the AC motors 13A, 13B. The drive power calculator 7 controls the drive power of the engine 1 and the AC motors 13A, 13B by outputting a drive power request value according to the driving condition of the vehicle.

The AC motor control system in the hybrid vehicle is described next with reference to FIG. 2. The control systems of the AC motors 13A, 13B are substantially the same. Therefore, the following description designates the motors 13A, 13B simply as an AC motor 13.

The direct current power source 11 implemented as a secondary battery is connected to the inverter 12 of three phase voltage control type, and the inverter 12 drives the AC motor 13 (i.e., an electric motor). Further, the inverter 12 may be connected to the direct electric current power source 11 through, for example, a voltage-boost converter.

The AC motor 13 is a three phase permanent magnet-type synchronous motor, which includes a built-in permanent magnet, and is equipped with a rotor position sensor 14 that detects a rotation position (i.e., a rotation angle) of the rotor. Further, an electric current sensor 15 detects an electric current in one phase (i.e., described as a "sensor phase" hereinafter) among plural phases of the AC motor 13. In the present embodiment, the electric current in a W phase is detected as the sensor phase by the electric current sensor 15. Further, the AC motor 13 may be an induction motor or a synchronous motor of other types, other than the permanent magnet-type synchronous motor.

The inverter 12 drives the AC motor 13 by converting a DC voltage into three-phase AC voltage of U, V, W according to a 6 arm voltage instruction signals UU, UL, VU, VL, WU, WL.

The motor control circuit 16 performs a torque control by adjusting the AC voltage that is applied to the AC motor 13 so that an output torque of the AC motor 13 is controlled to have a target torque (i.e., an instructed torque value).

To control the deviation between an electric current instruction value and an electric current estimate value, in which the electric current instruction value is based on the instructed torque value and the electric current estimate value is based on an output of the electric current sensor 15, an electric current feedback (F/B) control of power supply for the AC motor 13 is performed in the following manner.

Figure 3:
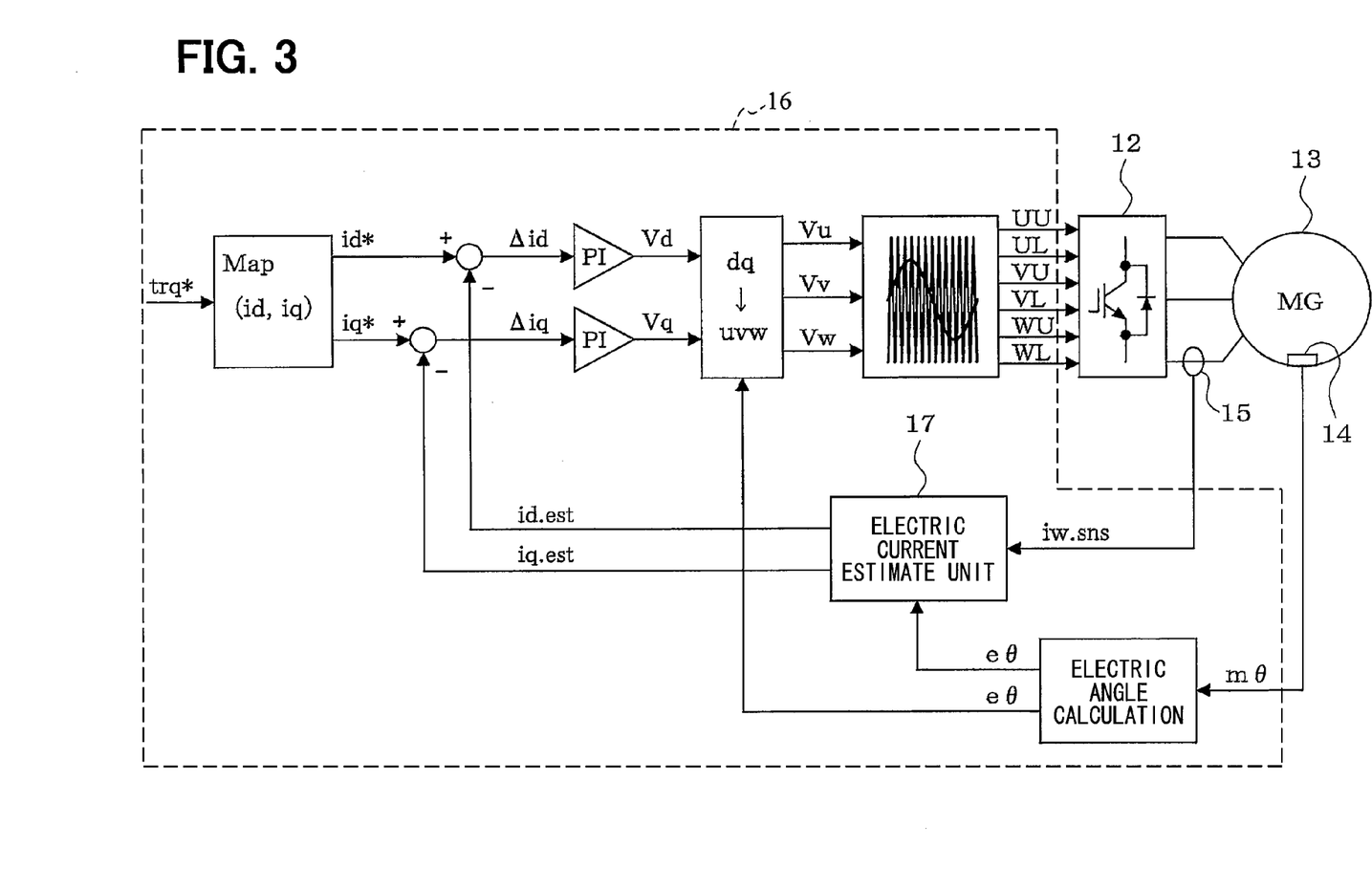
FIG. 3 is a block diagram of a current feedback control of the AC motor control system.

With reference to FIG. 3, the motor control circuit 16 calculates an instructed electric current vector according to, for example, a map or an equation based on an instructed torque value (trq*). The instructed electric current vector is represented in a rotor coordinate system (i.e., a rotating d-q coordinate system) that is set on the rotor of the AC motor 13, as a combination of a d-axis electric current instruction value (id*) and a q-axis electric current instruction value (iq*).

An electric angle (eθ) is calculated based on the rotor position (mθ) of the AC motor 13, which is detected by the rotor position sensor 14. Based on the electric angle (eθ) of the AC motor 13 and the electric current detection value (iw.sns) of the sensor phase (i.e., the W phase), which is detected by the electric current sensor 15, an electric current estimate unit 17 calculates an estimate electric current vector in the rotation coordinate system. The estimate electric current vector includes a d-axis electric current estimate value (id.est) and a q-axis electric current estimate value (iq.est), which may be referred to as d/q-axis electric current estimate value (id.est, iq.est). The electric current estimate unit 17 may be referred to as an electric current estimation unit in claims.

An instructed voltage vector is calculated based on the d-axis electric current estimate value (id.est) and the q-axis electric current estimate value (iq.est). Specifically, a d-axis voltage instruction value (Vd) is calculated according to, for example, a PI control, which reduces a deviation (Δid) between the d-axis electric current instruction value (id*) and the d-axis electric current estimate value (id.est). Similarly, a q-axis voltage instruction value (Vq) is calculated according to the PI control so that a deviation Δiq between the q-axis electric current instruction value (iq*) and the q-axis electric current estimate value (iq.est) is reduced. The d-axis voltage instruction value (Vd) and the q-axis voltage instruction value (Vq) may be referred to as the instructed voltage instruction (Vd, Vq).

Based on the instructed voltage vector (Vd, Vq) and the electric angle (eθ) of the AC motor 13, three phase voltage instruction values Vu, Vv, Vw are calculated. The values Vu, Vv, Vw are converted by, for example, a sine wave PWM control method into three phase 6 arm voltage instruction signals UU, UL, VU, VL, WU, WL, and the signals UU, UL, VU, VL, WU, WL are outputted to the inverter 12. In such manner, the feedback control of the power supply for the AC motor 13 is performed to reduce the deviation between the electric current instruction values (id*, iq*), which are based on the instructed torque value, and the d/q electric current estimate values (id.est, iq.est), which are based on the output of the sensor 15.

Figure 7:
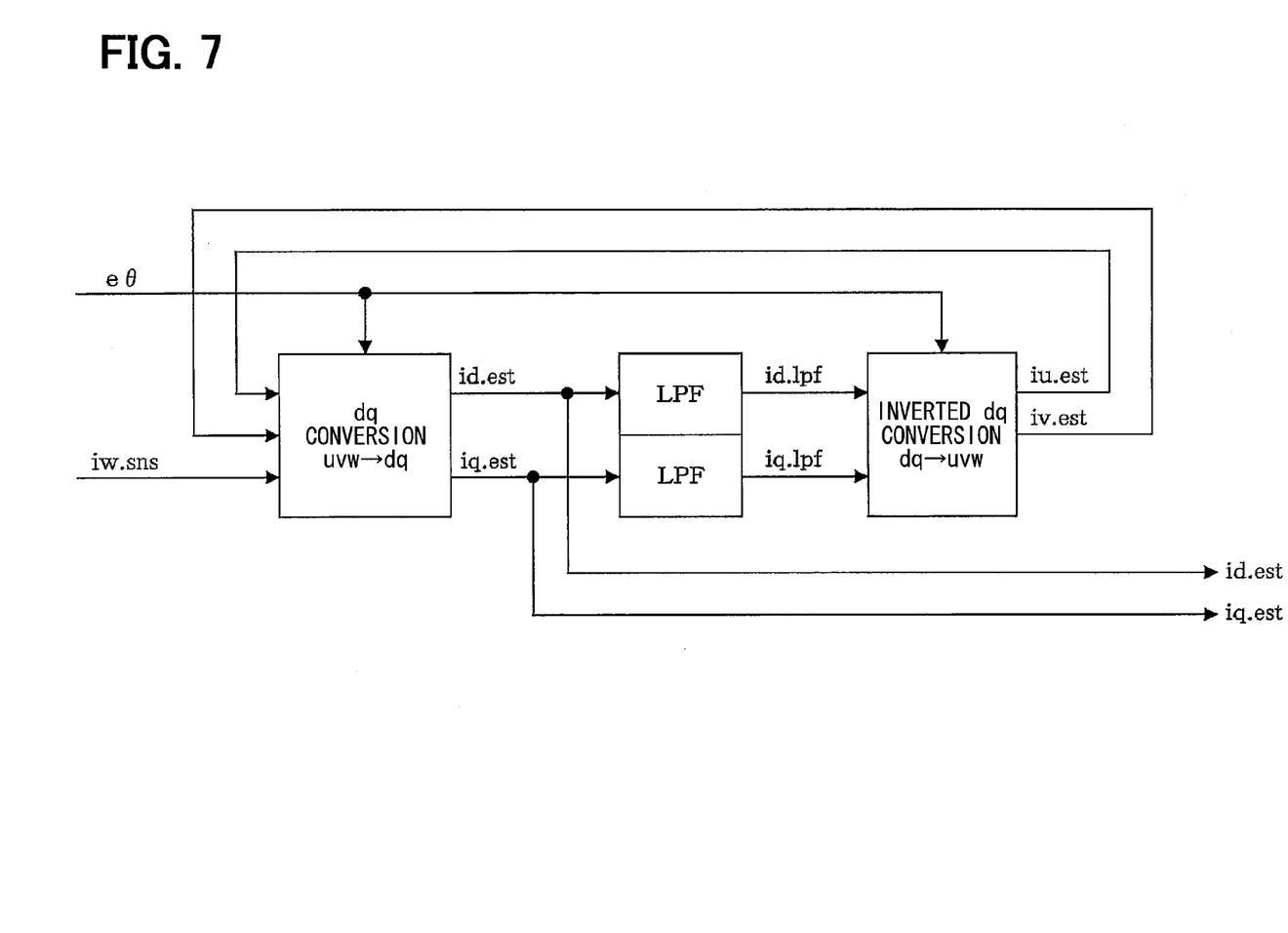
FIG. 7 is a block diagram of a system that determines an electric current estimate as a comparison example.

With reference to FIG. 7, a comparison example of the estimation of the electric current in the AC motor 13 based on the inventors' study is shown. In this example, a system of FIG. 7 estimates an electric current by repeatedly performing a dq conversion and an inverted dq conversion at predetermined intervals. Specifically, the dq conversion calculates the d/q axis electric current estimate values (id.est, iq.est) based on the electric current detection value (iw.sns) in W phase (i.e., the sensor phase) detected by the sensor 15 and the electric current estimate values (iu.est, iv.est) in the other two phases of U and V in a previous cycle. The inverted dq conversion calculates the electric current estimate values (iu.est, iv.est) in the other two phases of U and V based on smoothed values (id.lpf, iq.lpf) by performing a low-pass filter (LPF) process (e.g., an "annealing" process or a first order lag process) on the d/q axis electric current estimate values (id.est, iq.est) derived from the dq conversion.

Figure 8A:
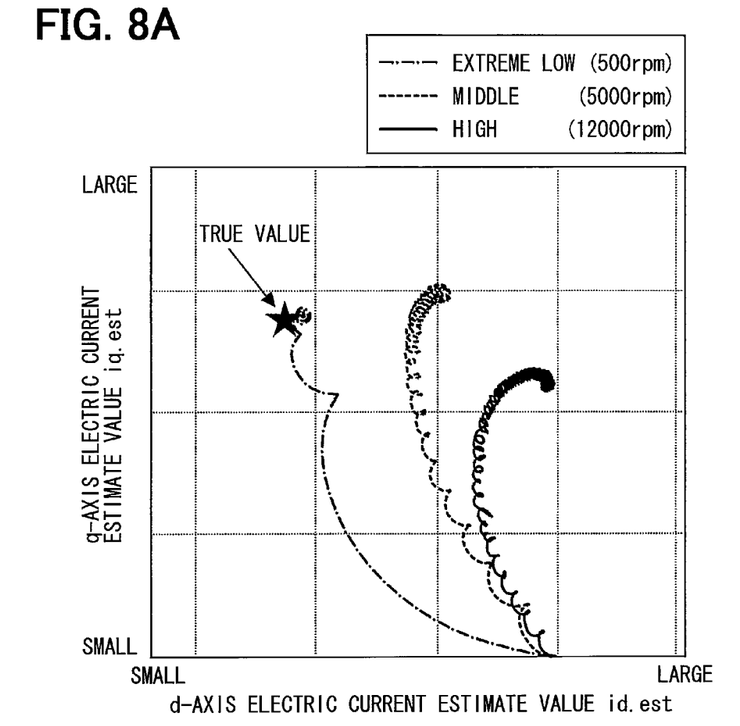
FIGS. 8A and 8B are graphical views of the electric current estimate determined by the system of FIG. 7 as the comparison example.
Figure 8B:
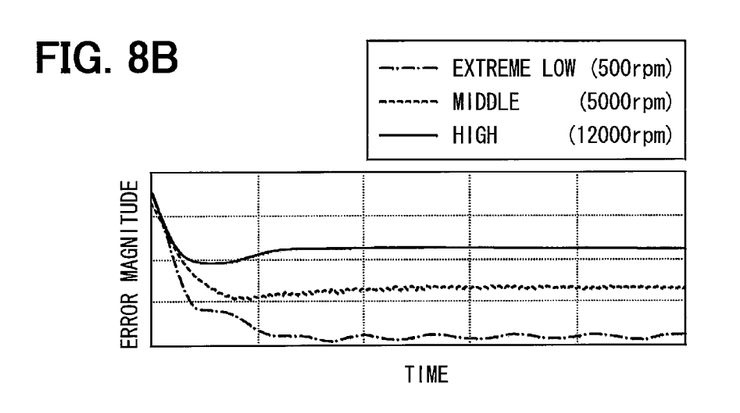

In the example of FIG. 7, the electric current estimation is accurate when the frequency of the electric current (i.e., a rotation speed of the AC motor 13) is very low. However, as shown in FIGS. 8A and 8B, when the frequency of the electric current (i.e., the rotation speed of the AC motor 13) increases, the inventors found that the electric current estimate value shifts in a phase delay direction and in an absolute value decreasing direction, thereby steadily causing a greater estimation error.

As a result of the study, the inventors of the present application found that the cause of such increase of the steady estimation error is the delay of the phase of the electric current estimate values of the other two phases in a previous cycle, which are used for the calculation of the d/q axis electric current estimate values (id.est, iq.est).

Specifically, the d/q axis electric current estimate values (id.est, iq.est) in the other two phases, which are alternate current values in synchronization with the electric angle (eθ) of the AC motor 13, have a phase delay from the electric current detection value (iw.sns) detected in the W phase (i.e., the sensor phase) in the current cycle by a phase amount of eθ, which is a change in the current cycle, because the AC motor 13 rotates between the previous cycle and the current cycle to cause such a change of the electric angle eθ.

Therefore, when calculating the d/q axis electric current estimate values (id.est, iq.est) by performing the dq conversion based on the electric current detection value (iw.sns) of the sensor phase and the electric current estimate values (iu.est, iv.est) of the other two phases, a mismatch of the phase between the electric current detection value (iw.sns) of the sensor phase and the electric current estimate values (iu.est, iv.est) of the other two phases of causes the electric current estimation error to be kept unchanged to have a steady estimation error, thereby deteriorating the estimation accuracy.

Figure 4:
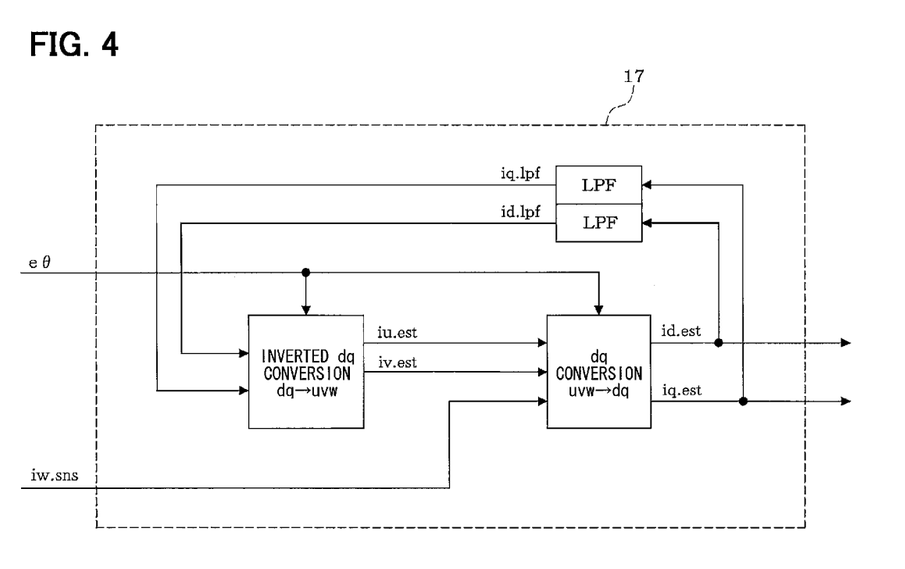
FIG. 4 is a block diagram of an electric current estimate unit of the AC motor control system of the present disclosure.

Therefore, in the present embodiment, the electric current estimate unit 17 is configured to repeatedly perform, at a predetermined interval T: an inverted dq conversion and a dq conversion. The inverted dq conversion calculates the other two phase (i.e., U and V) electric current estimate values (iu.est, iv.est) based on the smoothed electric current estimate values (id.lpf, iq.lpf) that are derived by smoothing the d/q axis electric current estimate values (id.est, iq.est) in the previous cycle. The dq conversion calculates the d/q axis electric current estimate values (id.est, iq.est) based on the other two phase (i.e., U and V) electric current estimate values (iu.est, iv.est) derived from the inverted dq conversion and the sensor phase electric current detection value (iw.sns) detected by the electric current sensor 15.

According to such configuration, even when the electric angle (eθ) changes due to the rotation of the AC motor between the previous cycle and the current cycle, the electric current estimation process in the current cycle does not have the phase delay because the electric current estimate values (id.est, iq.est) in the current cycle are estimated based on the d/q axis electric current estimate values (id.est, iq.est) of the previous cycle, which are not the alternate electric current values but the direct electric current values.

Further, since the other two phase electric current estimate values (iu.est, iv.est) are calculated by performing the inverted dq conversion on the smoothed values (id.lpf, iq.lpf) from the previous cycle, based on the electric angle (eθ) of the current cycle, such estimate values (iu.est, iv.est) have a matching phase with the sensor phase electric current estimate value (iw.sns) detected at the current calculation timing by the electric current sensor 15. Therefore, the steady estimation error is significantly reduced or eliminated. In other words, the chance of the phase delay or having mismatched phase kept unchanged from the previous cycle is no longer possible.

In such manner, by removing the error in the electric current estimation, which is due to the phase delay of the estimate values (iu.est, iv.est) in the other two phases relative to the sensor phase electric current estimate value (iw.sns), the estimation accuracy of the d/q axis electric current estimate values (id.est, iq.est) and the electric current estimate values (iu.est, iv.est) of the other two phases is improved.

Figure 5:
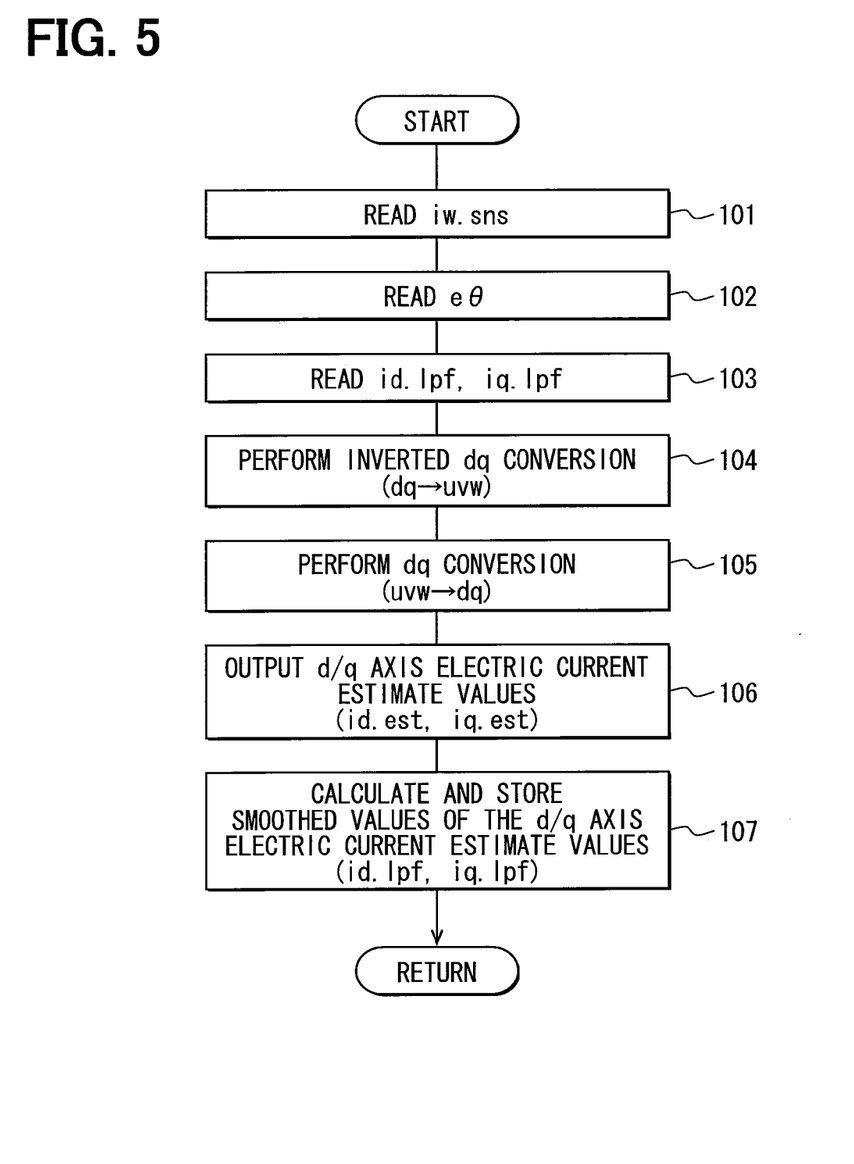
FIG. 5 is a flowchart of an electric current estimation routine performed by a motor control circuit.

The electric current estimation of the present embodiment is performed by the motor control circuit 16 as an electric current estimation routine shown in FIG. 5.

The electric current estimation routine of FIG. 5 is executed during a power on period of the motor control circuit 16 at a predetermined calculation cycle T in a repeated manner. After the start of execution of the routine, the motor control circuit 16 reads the electric current detection value iw.sns of the sensor phase (i.e., W phase), which is detected by the electric current sensor 15, at 101 and reads the electric angle eθ at 102. The electric angle eθ is calculated from the rotor position mθ of the AC motor 13, which is detected by the rotor position sensor 14.

The motor control circuit 16 then, at 103, reads the smoothed values id.lpf, iq.lpf derived by smoothing the d/q axis electric current estimate values id.est, iq.est of the previous cycle. In the first cycle of the routine just after the start of the power supply for the circuit 16, for which there is no previous cycle, the smoothed values id.lpf, iq.lpf derived by smoothing the d/q axis electric current estimate values id.est, iq.est of the previous cycle are respectively set to zero. In other words, the initial values of id.est and iq.est are both zero.

Based on the smoothed values id.lpf, iq.lpf, the motor control circuit 16, at 104, performs the inverted dq conversion for calculating the electric current estimate values iu.est, iv.est of other two phase (i.e., U and V). In the inverted dq conversion, the electric current estimate values iu.est, iv.est are calculated by equation (1).

$$\begin{bmatrix} iu.est \\ iv.est \end{bmatrix} = \sqrt{\frac{2}{3}} \begin{bmatrix} \cos(e\theta) & -\sin(e\theta) \\ \cos(e\theta - 120°) & -\sin(e\theta - 120°) \end{bmatrix} \begin{bmatrix} id.lpf \\ iq.lpf \end{bmatrix} \quad (1)$$

Based on the electric current estimate values iu.est, iv.est and the electric current detection value iw.sns of the sensor phase (i.e., W phase), which is detected by the electric current sensor 15, the motor control circuit 16, at 105, performs the dq conversion for calculating the d/q axis electric current estimate values id.est, iq.est. In the dq conversion, the d/q axis electric current estimate values id.est, iq.est are calculated by equation (2).

$$\begin{bmatrix} id.lpf \\ iq.lpf \end{bmatrix} \begin{bmatrix} \cos(e\theta) & \cos(e\theta - 120°) & \cos(e\theta + 120°) \\ -\sin(e\theta) & -\sin(e\theta - 120°) & -\sin(e\theta + 120°) \end{bmatrix} \begin{bmatrix} iu.est \\ iv.est \\ iw.sns \end{bmatrix} \quad (2)$$

Further, the dq conversion may be performed based on (i) one of the electric current estimate values of the other two phases (i.e., iu.est or iv.est) and (ii) the electric current detection value iw.sns of the sensor phase (W). For example, if the dq conversion is performed based on (i) the electric current estimate values iu.est of the U phase and (ii) the electric current detection value iw.sns of the sensor phase (W), the d/q axis electric current estimate values id.est, iq.est are calculated by equation (3).

$$\begin{bmatrix} id.est \\ iq.est \end{bmatrix} = \sqrt{2} \begin{bmatrix} \sin(e\theta + 120°) & -\sin(e\theta) \\ \cos(e\theta + 120°) & -\cos(e\theta) \end{bmatrix} \begin{bmatrix} iu.est \\ iw.sns \end{bmatrix} \quad (3)$$

The motor control circuit 16 outputs the d/q axis electric current estimate values id.est, iq.est as the estimation values of the current cycle at 106. The output values id.est, iq.est are, for example, used for the electric current F/B control.

The motor control circuit 16 then calculates the smoothed values id.lpf, iq.lpf, at 107, by smoothing the d/q axis electric current estimate values id.est, iq.est of the current cycle, and stores the smoothed values id.lpf, iq.lpf calculated in the buffer (i.e., in a memory area), before concluding the routine.

The smoothed d/q axis electric current estimate values are used in the next execution cycle of the routine (i.e., in the next execution time of the electric current estimation process), in which the values serve as the smoothed d/q axis electric current estimate values of the previous cycle.

As described above, the inverted dq conversion calculates the electric current estimate values iu.est, iv.est of other two phase (i.e., U and V) based on the smoothed electric current estimate values id.lpf, iq.lpf that are derived by smoothing the d/q axis electric current estimate values id.est, iq.est of the previous cycle. The dq conversion calculates the d/q axis electric current estimate values id.est, iq.est based on the electric current estimate values iu.est, iv.est derived from the inverted dq conversion and on the sensor phase electric current detection value iw.sns detected by the electric current sensor 15. According to the configuration of the present embodiment, the inverted dq conversion and the dq conversion are repeated at the predetermined interval T.

According to such configuration, even when the electric angle eθ changes due to the rotation of the AC motor between the previous cycle and the current cycle, the electric current estimation process in the current cycle does not have the phase delay because the electric current estimate values in the current cycle are estimated based on the smoothed values id.lpf, iq.lpf of the d/q axis electric current estimate values id.est, iq.est of the previous cycle, which are not the alternate electric current values but the direct electric current values.

Further, since the other two phase electric current estimate values iu.est, iv.est is calculated by performing the inverted dq conversion on the smoothed values id.lpf, iq.lpf from the previous cycle based on the electric angle eθ of the current cycle, such estimate values iu.est, iv.est have a matching phase with the sensor phase electric current estimate value iw.sns detected in the current cycle by the electric current sensor 15. Therefore, the steady estimation error is significantly reduced or eliminated, that is, the change of the phase delay or having mismatched phase kept unchanged from the previous cycle is no longer an issue.

Figure 6A:
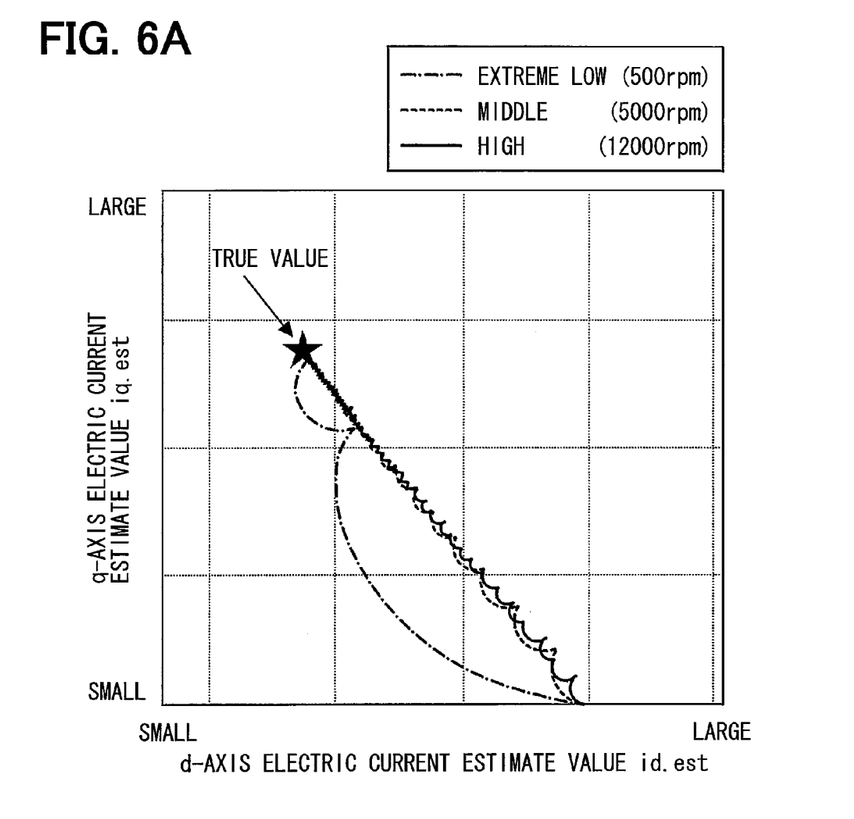
FIGS. 6A and 6B are graphical views of an electric current estimate determined by the electric current estimate unit of FIG. 4.
Figure 6B:
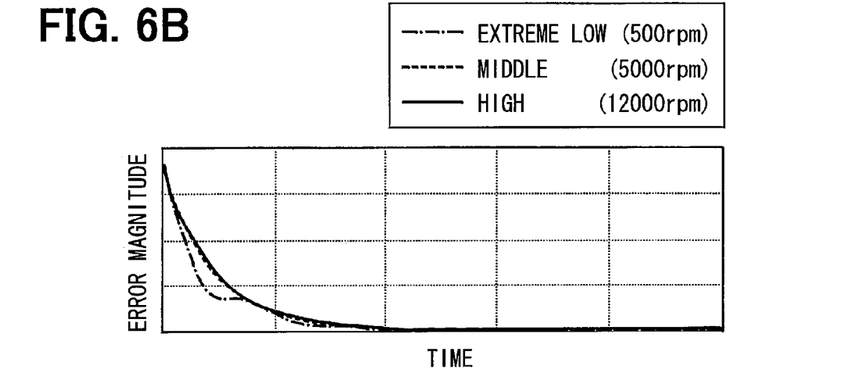

In such manner, as shown in FIGS. 6A and 6B, by preventing the error in the electric current estimation, which is due to the phase delay of the estimate values iu.est, iv.est of the other two phases relative to the sensor phase electric current estimate value iw.sns, the estimation accuracy of the d/q axis electric current estimate values id.est, iq.est and the electric current estimate values iu.est, iv.est of the other two phases is improved. Specifically, the estimation error (i.e, the steady error) of the d/q axis electric current estimate values id.est, iq.est relative to the true value is kept at a small value even when the frequency of the electric current (i.e., the rotation speed of the motor) is increased. Therefore, by having one electric current sensor for one AC motor (i.e., a single-phase sensing of electric current), the electric current estimation accuracy of the AC motor 13 is improved, and the volume and cost reduction of the inverter is achieved.

Since the power supply for the AC motor 13 is controlled by a feed-back (F/B) control of the d/q axis electric current estimate values id.est, iq.est, which are accurately calculated, the output of the torque from the AC motor 13 is accurately and stably controlled by such F/B control of the electric current.

The direct estimation of the d/q axis electric current estimate values id.est, iq.est based on the electric current detection value in one phase and the F/B control of the electric current for the AC motor 13 based on such direct estimation prevents, in principle, a secondary fluctuation of the output torque caused by the error of gains between two or more electric current detection sensors. In other words, the torque fluctuation due to the fluctuation of the d/q axis electric current at an electric current secondary frequency is prevented.

By using an electric current sensor in only one phase (i.e., a single-phase sensing of electric current), the error associated with the estimation accuracy of the electric current in the AC motor influences the torque fluctuation of the AC motor. However, based on the present disclosure, the torque fluctuation of the AC motor 13 is reduced due to the reduction of the error associated with the electric current estimation, thereby diminishing the vibration of a device having the AC motor control system that uses the single-phase sensing of the electric current. Therefore, the control of the in-vehicle motor based on the present disclosure is especially advantageous for achieving a high standard of comfort and sophisticated drivability for the vehicle occupant.

Based on the present disclosure, the d/q axis electric current estimate values id.est, iq.est used for the F/B control of the electric current supplied for the AC motor 13 may be replaced with the smoothed values id.lpf, iq.lpf that are derived by performing an LPF process on the d/q axis electric current estimate values id.est, iq.est.

Further, the electric current estimation process is performed by using the smoothed values id.lpf, iq.lpf as the d/q axis electric current estimate values id.est, iq.est in the previous cycle. However, since the phase mismatch between the previous cycle and the current cycle has already been resolved, the d/q axis electric current estimate values id.est, iq.est may be used "as is" without performing the smoothing process.

As described above, based either on (i) the smoothed values id.lpf, iq.lpf or (ii) the before-smoothing values id.est, iq.est, the d/q axis electric current estimate values for the F/B control of the electric current supplied for the AC motor 13 and the d/q axis electric current estimate values in the previous cycle that are used for the electric current estimation process in the current cycle are calculable (i.e., can be estimated without causing the steady estimation error). Therefore, the smoothed values id.lpf, iq.lpf or the before-smoothing values id.est, iq.est may be arbitrarily combined for the calculation of the estimate values.

The preferable combination of such estimate values may be defined as follows. For the F/B control of the electric current supplied for the AC motor 13, the d/q axis electric current estimate values id.est, iq.est are used as before-smoothing values, which reflects a greater amount of information from the electric current detection value from the electric current sensor 15 for the improved responsiveness of the F/B control of the electric current in terms of high speed and high accuracy. For the prevention of steep change of the d/q axis electric current estimate values id.est, iq.est, the d/q axis electric current estimate values id.est, iq.est are used as smoothed values id.lpf, iq.lpf, thereby enabling a stable operation of the AC motor 13 based on a decreased sensitivity to the distortion of the wave form of the motor electric current and/or the noise on the electric current detection value. Such an advantageous operation of the AC motor 13 is enabled by the configuration of the above-described embodiment.

Further, the choice of the values may be changed according to an operation condition. For example, for a condition in which the torque may steeply change, the before-smoothing values id.est, iq.est may be used in a prioritized manner to achieve high responsiveness. On the other hand, for a condition in which the torque is expected to be stable, the smoothed values id.lpf, iq.lpf may be used in a prioritized manner to achieve a stable operation.

Further, the detection of the electric current by using the electric current sensor in W phase (i.e., in the sensor phase), in the present disclosure may be changed to another configuration, such as a detection of the electric current by using the electric current sensor in U phase or in V phase.

Figure 9:
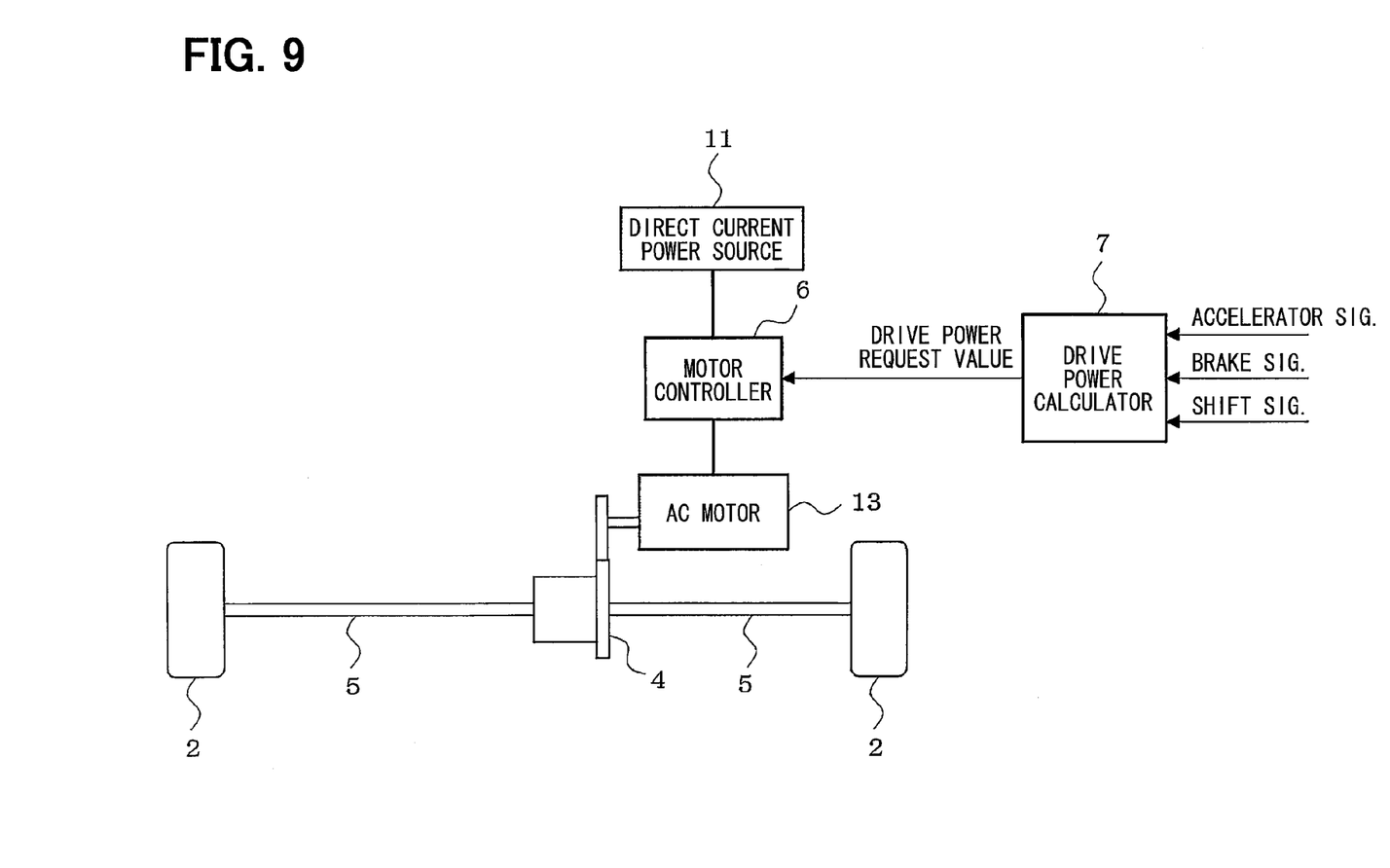
FIG. 9 is a block diagram of a drive system of a battery vehicle of the present disclosure.

The present disclosure may be applicable to a drive system of an electric vehicle shown in FIG. 9. More practically, the drive system of the electric vehicle may have the AC motor 13 installed in the vehicle, and may drive wheels 2 by a driving force from the AC motor 13. The AC motor 13 is connected to a direct current power source 11 through a motor controller 6, which includes, for example, an inverter 12 (FIG. 2) and a motor control circuit 16 (FIG. 2). That is, the power source 11 having a secondary battery or the like may supply the direct current for the motor 13 through the controller 6, or may receive the direct current from the motor 13 through the controller 6.

The drive power calculator 7 is a computer or a similar part that controls the hybrid vehicle, and detects a vehicle's driving condition by reading signals from various sensors and devices such as an accelerator sensor, a brake switch, a shift switch and the like (sensors and switches not illustrated).

The drive power calculator 7 transmits and receives a control signal, a data signal and the like to and from the motor control circuit 16 that controls an operation of the AC motor 13, and controls the drive power of the AC motor 13 by outputting a drive power request value according to the driving condition of the vehicle.

The present disclosure, i.e., the drive system described above, may also be applicable to such drive system of the electric vehicle, for achieving the improved accuracy of the electric current estimation for the control of the AC motor, by devising the single-phase sensing of electric current (one sensor for one motor), which achieves the cost reduction as well.

Furthermore, the configuration of the above embodiment, which is an application of the present disclosure to a system having one set of the inverter and the motor, may be changed to different configurations, such as a hybrid system in FIG. 1, e.g., a system having two or more sets of the inverter and the motor.

Furthermore, the present disclosure may also be applicable to the AC motor control apparatus in various systems other than the electric vehicle system, or the hybrid vehicle system described above.

Such changes and modifications are to be understood as being within the scope of the disclosure as defined by the appended claims.

What is claimed is:

1. A control apparatus of an alternate current AC motor, which includes a three-phase AC motor and an electric current detector for detecting an electric current, as an electric current detection value, of a sensor phase, which is one of three phases of the three-phase AC motor, the control apparatus comprising:
    an electric current estimation unit configured to repeatedly perform at predetermined intervals an inverted dq conversion and a dq conversion for determining a d/q axis electric current estimate values in a rotation coordinate system of the AC motor, wherein
    the inverted dq conversion calculates an electric current estimate values for phases other than the sensor phase based on the d/q axis electric current estimate values of a previous cycle in the rotation coordinate system of the AC motor previously calculated and stored in the memory, and
    the dq conversion calculates the d/q axis electric current estimate values of a current cycle based on the electric current estimate values for the phases other than the sensor phase calculated by the inverted dq conversion and the electric current detection value of the sensor phase detected by the electric current detector; and
    the control apparatus further comprises: a control unit configured to control a power supply for the AC motor based on the d/q axis electric current estimate values calculated by the dq conversion.

2. The control apparatus of claim 1, wherein
the electric current estimation unit calculates the electric current estimate values for the phases other than the sensor phase based on smoothed values of the d/q axis electric current estimate values of the previous cycle when performing the inverted dq conversion.

* * * * *